United States Patent
Aldana et al.

(10) Patent No.: US 9,560,620 B2
(45) Date of Patent: Jan. 31, 2017

(54) METHODS AND SYSTEMS FOR ENHANCED ROUND TRIP TIME (RTT) EXCHANGE

(71) Applicant: QUALCOMM Incorporated, San Diego, CA (US)

(72) Inventors: Carlos Aldana, Mountain View, CA (US); Subash Marri Sridhar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/699,966

(22) Filed: Apr. 29, 2015

(65) Prior Publication Data

US 2015/0319631 A1 Nov. 5, 2015

Related U.S. Application Data

(60) Provisional application No. 61/988,886, filed on May 5, 2014.

(51) Int. Cl.
| | |
|---|---|
| H04W 24/08 | (2009.01) |
| H04L 5/00 | (2006.01) |
| H04W 64/00 | (2009.01) |

(52) U.S. Cl.
CPC ............ *H04W 64/00* (2013.01); *H04L 5/0055* (2013.01); *H04W 24/08* (2013.01)

(58) Field of Classification Search
CPC ...... H04W 24/00; H04W 24/08; H04W 24/10; H04W 76/02; H04W 64/00; H04W 72/082; H04L 5/005; H04L 1/0009; H04L 5/0055

See application file for complete search history.

(56) References Cited

U.S. PATENT DOCUMENTS

| | | | | |
|---|---|---|---|---|
| 2013/0336131 | A1* | 12/2013 | Zhang | H04W 24/00 370/252 |
| 2014/0335885 | A1* | 11/2014 | Steiner | H04W 64/00 455/456.1 |

OTHER PUBLICATIONS

Hart et al., Location related comments, Mar. 18, 2014, IEEE 802.11-13/1509r5.*
Hart et al., Location related comments, Apr. 29, 2014, IEEE 802.11-14/0526r0.*
Aldana C., "Location Related Corrections to Draft 2.7; 11-14-0525-00-000m-location-related-corrections-to-draft-2-7", IEEE Draft; 11-14-0525-00-000m-Location-Related-corrections-to-Draft-2-7, IEEE-SA Mentor, Piscataway, NJ, USA, vol. 802 .11m, Apr. 15, 2014 (Apr. 15, 2014), pp. 1-27, XP068069198, [retrieved on Apr. 15, 2014] p. 13, paragraph 8.4.2.21.18—p. 15, paragraph 8.4.2.166, p. 19, paragraph 8.6.8.25—p. 23, paragraph 10.24.6.3.

(Continued)

*Primary Examiner* — Chi H Pham
*Assistant Examiner* — Shailendra Kumar
(74) *Attorney, Agent, or Firm* — Berkeley Law & Technology Group, LLP

(57) ABSTRACT

Disclosed are methods and systems for obtaining measurements of a range between devices based on a Round Trip Time (RTT) for an exchange messages. In particular, described are techniques for transmitting messages between or among devices to share computed parameters indicative of ranges between devices.

31 Claims, 8 Drawing Sheets

(56) References Cited

OTHER PUBLICATIONS

Hart B., "Location related CIDs; 11-13-1509-05-000m-location-related-CIDS", IEEE Draft; 11-13-1509-05-000M-Location-Related-CIDS, IEEE-SA Mentor, Piscataway, NJ USA, vol. 802.11m, No. 5, Mar. 19, 2014 (Mar. 19, 2014), pp. 1-27, XP068068823, [retrieved on Mar. 19, 2014] p. 15, paragraph 8.6.8.25—p.24.

Hart B., "Location Related Comments; 11-14-0526-00-000m-location-related-comments", IEEE Draft; 11-14-0526-00-000m-Location-Related-Comments, IEEE-SA Mentor, Piscataway, NJ, USA, vol. 802.11m, Apr. 29, 2014 (Apr. 29, 2014), pp. 1-10, XP068069204, [retrieved on Apr. 29, 2014] p. 5, paragraph 8.4.2.44—p. 7, paragraph 10.11.10.3.

International Search Report and Written Opinion—PCT/US2015/028670—ISA/EPO—Jul. 30, 2015.

\* cited by examiner

|  | Range Entry Count | Range Entry | Optional Subelements |
|---|---|---|---|
| Octets: | 1 | M x (13 or 11 bytes) | variable |
| * Measurement Report field format for a Fine Timing Measurement STA Range report ||||

FIG. 7

|  | Measurement Start or Partial TSF Timer | BSSID | Range | Max Range Error |
|---|---|---|---|---|
| Octets: | 4 or 2 bytes | 6 | 2 | 1 |
| * Range Entry field format(#2403) |||||

FIG. 8

METHODS AND SYSTEMS FOR ENHANCED ROUND TRIP TIME (RTT) EXCHANGE

CROSS-REFERENCE TO RELATED APPLICATIONS

This application claims the benefit of U.S. Provisional Application No. 61/988,886, entitled "Methods and Systems for Enhanced Round Trip Time (RTT) Exchange," filed May 5, 2014, which is assigned to the assignee hereof and which is expressly incorporated herein by reference.

BACKGROUND

Field

Embodiments described herein are directed to obtaining measurements of signals acquired from a mobile transmitter.
Information Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the first message.

BRIEF DESCRIPTION OF THE DRAWINGS

Non-limiting and non-exhaustive aspects are described with reference to the following figures, wherein like reference numerals refer to like parts throughout the various figures unless otherwise specified.

FIG. 7 is a diagram showing fields in a fine timing measurement range report according to an embodiment.

FIG. 8 is a diagram showing fields of a range entry portion of a fine timing measurement range report according to an embodiment.

SUMMARY

Figure 1:
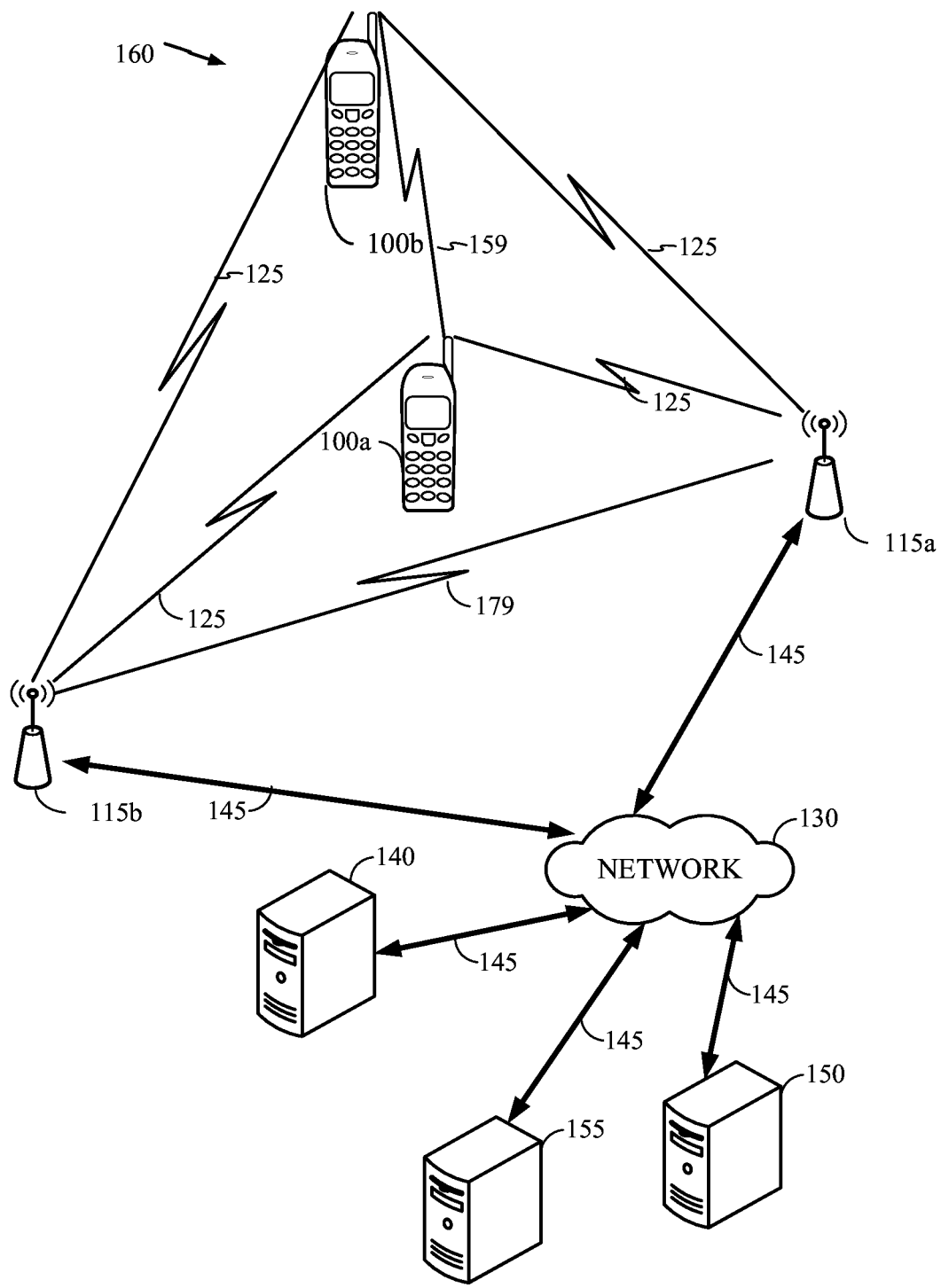
FIG. 1 is a system diagram illustrating certain features of a system containing a mobile device, in accordance with an implementation.

Briefly, particular implementations are directed to a method at an initiating wireless station (STA) for obtaining fine timing measurements comprising: transmitting a fine timing measurement (FTM) request message to a responding STA, the FTM request message indicating a capability of said initiating STA to share ranging parameters with said responding STA; receiving one or more FTM messages from said responding STA in response to said FTM request message; computing one or more parameters indicative of a range between said initiating STA and said responding STA based, at least in part, on the one or more FTM messages; and transmitting one or more FTM range report messages containing said computed one or more parameters to said responding STA.

Another particular implementation is directed to an initiating wireless station (STA), comprising: a transceiver to transmit messages to and receive messages from a wireless communication network; and one or more processors configured to: initiate transmission of a fine timing measurement (FTM) request message through said transceiver to a responding STA, the FTM request message indicating a capability of said initiating STA to share ranging parameters with said responding STA; obtain one or more FTM messages received at said transceiver from said responding STA in response to said FTM request message; compute one or more parameters indicative of a range between said initiating STA and said responding STA based, at least in part, on the one or more FTM messages; and initiate transmission of one or more FTM range report messages containing said computed one or more parameters through said transceiver to said responding STA.

Another particular implementation is directed to a non-transitory storage medium comprising machine-readable instructions stored thereon which are executable by one or more processors of an initiating STA to: initiate transmission of a fine timing measurement (FTM) request message to a responding STA, the FTM request message indicating a capability of the initiating STA to share ranging parameters with the responding STA; obtain one or more FTM messages received at the initiating STA from the responding STA in response to the FTM request message; compute one or more parameters indicative of a range between the initiating STA and the responding STA based, at least in part, on the one or more FTM messages; and initiate transmission of one or more FTM range report messages containing the computed one or more parameters to the responding STA.

Another particular implementation is directed to an apparatus, at an initiating wireless station (STA), comprising: means for transmitting a fine timing measurement (FTM) request message to a responding STA, the FTM request message indicating a capability of initiating STA to share ranging parameters with the responding STA; means for receiving one or more FTM messages from the responding STA in response to the FTM request message; means for computing one or more parameters indicative of a range between the initiating STA and the responding STA based, at least in part, on the one or more FTM messages; and means for transmitting one or more FTM range report messages containing the computed one or more parameters to the responding STA.

Another particular implementation is directed to a method at a responding wireless station (STA) for obtaining fine timing measurements comprising: receiving a fine timing measurement (FTM) request message from an initiating STA, the FTM request message indicating a capability of said initiating STA to share ranging measurements with said responding STA; transmitting one or more FTM messages to said initiating STA in response to said FTM request message; and receiving one or more FTM range report messages from said initiating STA containing one or more parameters indicative of a range, said one or more parameters being computed at said initiating STA based, at least in part, on said transmitted one or more FTM messages.

Another particular implementation is directed to a responding wireless station (STA), comprising: a transceiver to transmit messages to and receive messages from a wireless communication network; and one or more processors configured to: obtain a fine timing measurement (FTM) request message received at said transceiver from an initiating STA, the FTM request message indicating a capability of said initiating STA to share ranging measurements with said responding STA; initiate transmission of one or more FTM messages through said transceiver to said initiating STA in response to said FTM request message; and obtain one or more FTM range report messages received at said transceiver from said initiating STA containing one or more parameters indicative of a range, said one or more parameters being computed at said initiating STA based, at least in part, on said transmitted one or more FTM messages.

Another particular implementation is directed to a non-transitory storage medium comprising machine-readable instructions stored thereon which are executable by one or more processors of a responding STA to: obtain a fine timing measurement (FTM) request message received at responding STA from an initiating STA, the FTM request message indicating a capability of the initiating STA to share ranging measurements with responding STA; initiate transmission of one or more FTM messages to initiating STA in response to the FTM request message; and obtain one or more FTM range report messages received at responding STA from the initiating STA containing one or more parameters indicative of a range between the initiating STA and the responding STA, the one or more parameters being computed at initiating STA based, at least in part, on the transmitted one or more FTM messages.

Another particular implementation is directed to an apparatus, at a responding STA, comprising: means for receiving a fine timing measurement (FTM) request message from an initiating STA, the FTM request message indicating a capability of initiating STA to share ranging measurements with the responding STA; means for transmitting one or more FTM messages to the initiating STA in response to the FTM request message; and means for receiving one or more FTM range report messages from the second wireless transceiver device containing one or more parameters indicative of a range between the initiating STA and the responding STA, the one or more parameters being computed at the initiating STA based, at least in part, on the transmitted one or more FTM messages.

It should be understood that the aforementioned implementations are merely example implementations, and that claimed subject matter is not necessarily limited to any particular aspect of these example implementations.

DETAILED DESCRIPTION

As discussed below, particular message flows may enable effective and efficient measurements of a round trip time (RTT) in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point, personal area network (PAN) or femto cell). Particular message flows and fields in message frames may enable obtaining RTT measurements with sufficient accuracy for measuring a range between the wireless STAs using fewer messages, for example. Such a measured range may be used in any one of several applications including positioning operations, for example.

As discussed below, a first STA may transmit a fine timing measurement request message to a second STA to initiate a process for an exchange of messages or frames enabling the first STA to obtain an RTT measurement. In a particular implementation, the fine timing measurement request message may include an indication as to whether the first STA is capable of sharing ranging measurements or other parameters indicative of range. In a particular implementation, subsequent to computation of an RTT measurement, the first STA may transmit one or more messages to the second STA comprising a computed range or RTT measurement or other parameter indicative of range. It should be understood that this is merely an example implementation and that claimed subject matter is not limited in this respect.

According to an embodiment, as shown in FIG. 1, mobiles device 100a or 100b may transmit radio signals to, and receive radio signals from, a wireless communication network. In one example, a mobile device 100 may communicate with a communication network by transmitting wireless signals to, or receiving wireless signals from, a local transceiver 115 over a wireless communication link 125.

In a particular implementation, a local transceiver 115 may be positioned in an indoor environment. A local transceiver 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, local transceiver 115a or 115b may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between a mobile device 100 and servers 140, 150 or 155 through a local transceiver 115. In another implementation, network 130 may comprise wired or wireless communication network infrastructure to facilitate mobile cellular communication with mobile device 100.

In a particular implementation, a mobile device 100 or local transceiver 115 may be capable of computing a position fix based, at least in part, on signals acquired from local transmitters (e.g., WLAN access points positioned at known locations). For example, a receiver device (e.g., a mobile device 100 or local transceiver 115) may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, a mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In particular implementations, a mobile device 100 or a local transceiver 115 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver (e.g., between a mobile device 100 and local transceiver 115 over a wireless link 125), between two peer mobile devices (e.g., between mobile devices 100a and 100b over wireless link 159), or between two stationary transceivers (e.g., between local transceiver 115a and local transceiver 115b over wireless link 179), just to provide a few examples. In particular implementations, various techniques described herein may incorporate some, but not necessarily all, aspects or features of IEEE Standard 802.11 for Information technology—Telecommunications and information exchange between systems, Local and metropolitan area networks—Specific requirements Part 11: Wireless LAN Medium Access Control (MAC) and Physical Layer (PHY), Feb. 6, 2012, section 10.23.5 (hereinafter "IEEE std. 802.11"). Indeed, it should be understood that some features described herein are not shown, described or taught in the IEEE std. 802.11.

Figure 2:
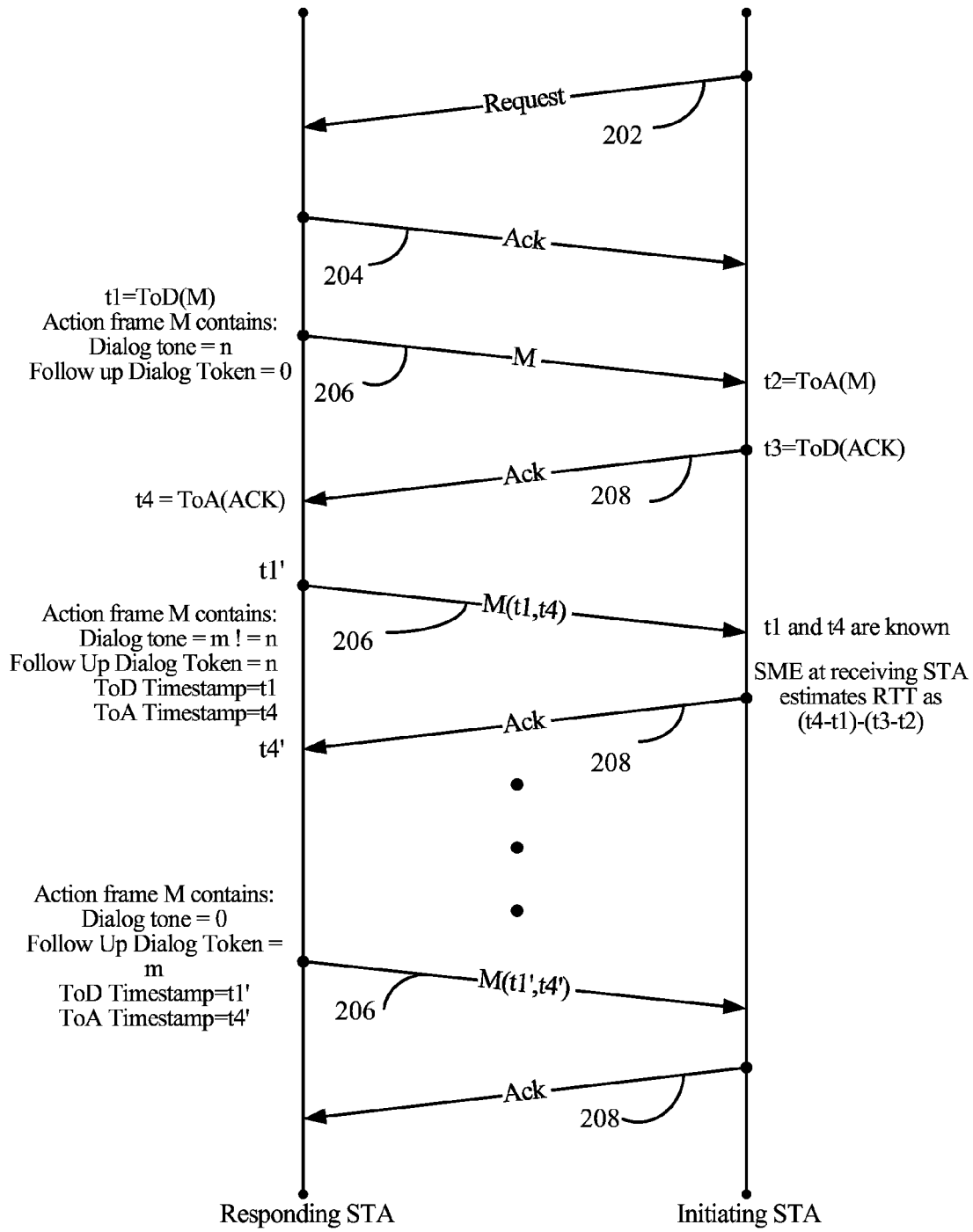
FIGS. 2 through 4 are diagrams illustrating message flows between wireless stations (STAs) according to particular embodiments.

FIG. 2 is a diagram illustrating a message flow between wireless stations STAs including a "responding" STA and an "initiating" STA according to an embodiment. In this context, a responding STA or initiating STA may comprise any one of several transceiver devices including a mobile device (e.g., mobile device 100) or stationary access transceiver device (e.g., local transceiver 115). It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a fine timing measurement request message or frame ("Request") 202 to the responding STA and receive a fine timing request message acknowledgement message or frame ("Ack") 204 transmitted in response. In a particular implementation, while not limiting claimed subject matter in this respect, contents of such a fine timing measurement request message 202 may be as shown in the IEEE std. 802.11 at section 8.6.8.25. In particular implementations, such an Ack frame 204 may merely provide an indication of receipt of a previously transmitted message. The initiating STA may then obtain or compute an RTT measurement based, at least in part, on time stamp values (t1, t4) provided in fine timing measurement messages or frames ("M") 206 received from the responding STA (and transmitted in response to receipt of a fine timing measurement request message). In a particular implementation, as shown in the message flow diagram, a sequence of multiple exchanges of alternating fine timing measurement messages 206 followed by fine timing measurement acknowledgement messages 208 may create additional time stamp values (t1, t2, t3 and t4).

According to an embodiment, a fine timing measurement (FTM) request message transmitted by an initiating STA may include fields, parameters, etc. characterizing a desired exchange of messages with a responding STA to provide fine timing measurements to the initiating STA enabling the initiating STA to compute an RTT measurement. In response to receipt of a FTM request message, a responding STA may transmit to the initiating STA one or more FTM messages including measurements or parameters enabling the initiating STA to compute RTT or other parameters indicative of range.

In a particular implementation, while not limiting claimed subject matter in this respect, contents of such a fine timing measurement message or frame may be as shown in the IEEE std. 802.11 at section 8.6.8.26. In one example implementation, an initiating STA may compute an RTT measurement as (t4−t1)−(t3−t2), where t2 and t3 are the time of receipt of a previous fine timing measurement message or frame and transmission of a preceding acknowledgement message or frame, respectively. The initiating STA may transmit a series of fine timing measurement request messages in a burst to obtain a corresponding number of RTT measurements which may be combined for cancellation of unbiased measurement noise in computing a range between the receiving and responding STAs.

According to an embodiment, an RTT measurement computed at an initiating STA may be used for obtaining an estimated location of the initiating STA using techniques described above such as trilateration. In other implementations, an RTT measurement computed (and/or range computed based on one or more RTT measurements) at an initiating STA may be shared with a responding STA (participating in obtaining fine timing measurements used in computing RTT). In one embodiment, a fine timing measurement request message may comprise many fields including a "trigger" field in which an initiating STA may characterize a transaction between the initiating STA and a responding STA in obtaining a fine timing measurement. In a particular implementation, an initiating STA may specify a particular value in a trigger field of a fine timing measurement request message (e.g., two) indicating that the initiating STA is able and willing to share one or more computed RTT measurement (and/or range computed from RTT measurements) with a recipient responding STA. This is illustrated in the signal flow of FIG. 3. As shown, an initiating STA transmits a fine timing measurement request message 302 specifying a value of two in a trigger field. In a subsequent exchange of timing measurement messages 304 and ACK messages 306, the initiating STA may compute an RTT value as discussed above. Following an ACK message 306 transmitted by the initiating STA in response to receiving a final fine timing measurement message 304 (e.g., transporting values for t1 and t4), the initiating STA may transmit an FTM range report message 308 containing a value for RTT (and/or range) computed based, at least in part, on fine timing measurements received from the responding STA.

Figure 3:
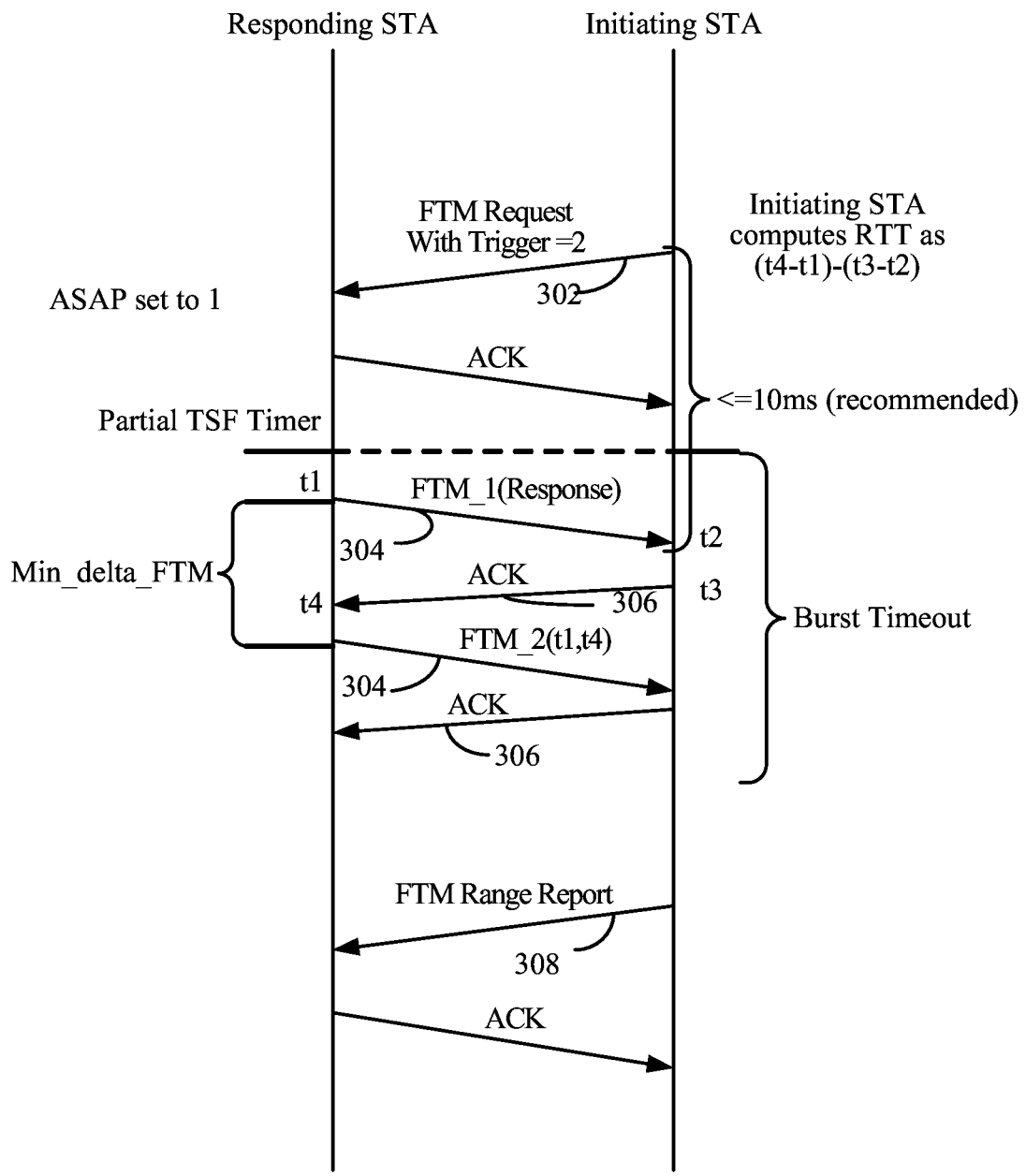
Figure 4:
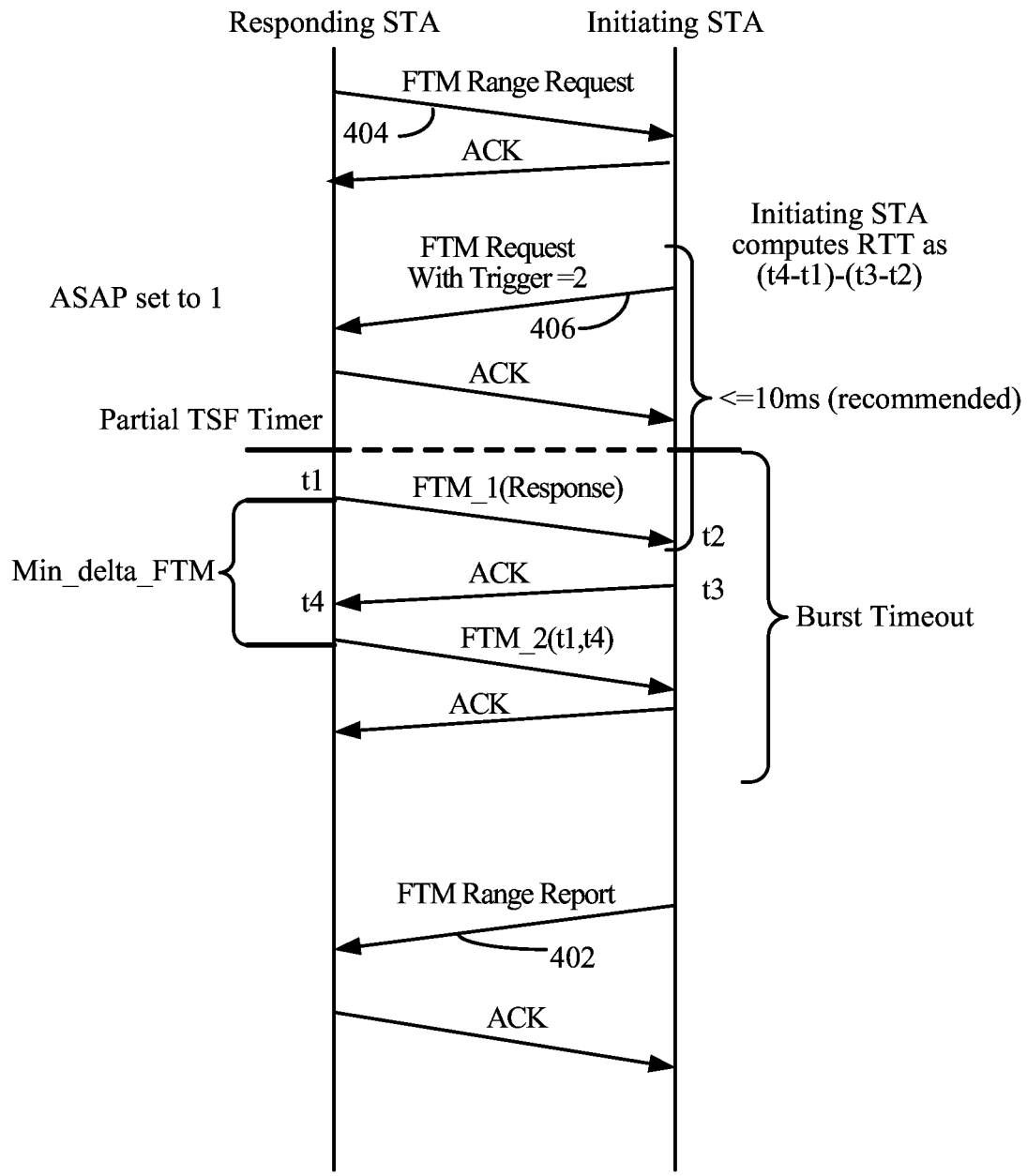

The particular implementation of FIG. 3 is directed to providing an unsolicited FTM range report message from an initiating STA to a responding STA. FIG. 4 is a diagram showing a message flow in which a responding STA solicits transmission of a FTM range report message 402 by the initiating STA. Here, transmission of an FTM range request message 404 by a responding STA occurs prior to transmission of a FTM request message 406 by an initiating STA. In a particular implementation, the initiating STA may transmit an FTM request message 406 in response to receipt of an FTM range request message 406 received from the responding STA. Here, the FTM request message 406 may specify a particular value in a Trigger field (e.g., "2") indicating that the FTM request message 406 contains a range measurement embedded in particular field. This range measurement may have been computed based, at least in part, on a previous exchange of FTM request messages and FTM messages between the initiating STA and responding STA.

Figure 5:
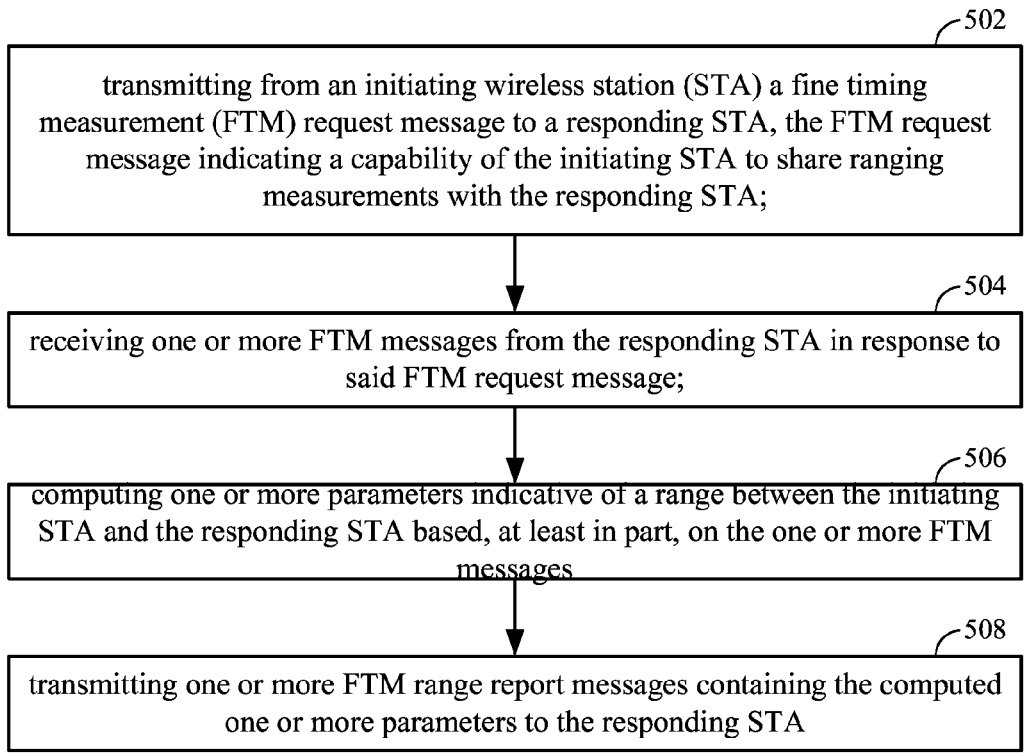
FIGS. 5 and 6 are flow diagrams of processes performed by STAs in connection with an exchange of messages according to particular embodiments.
Figure 6:
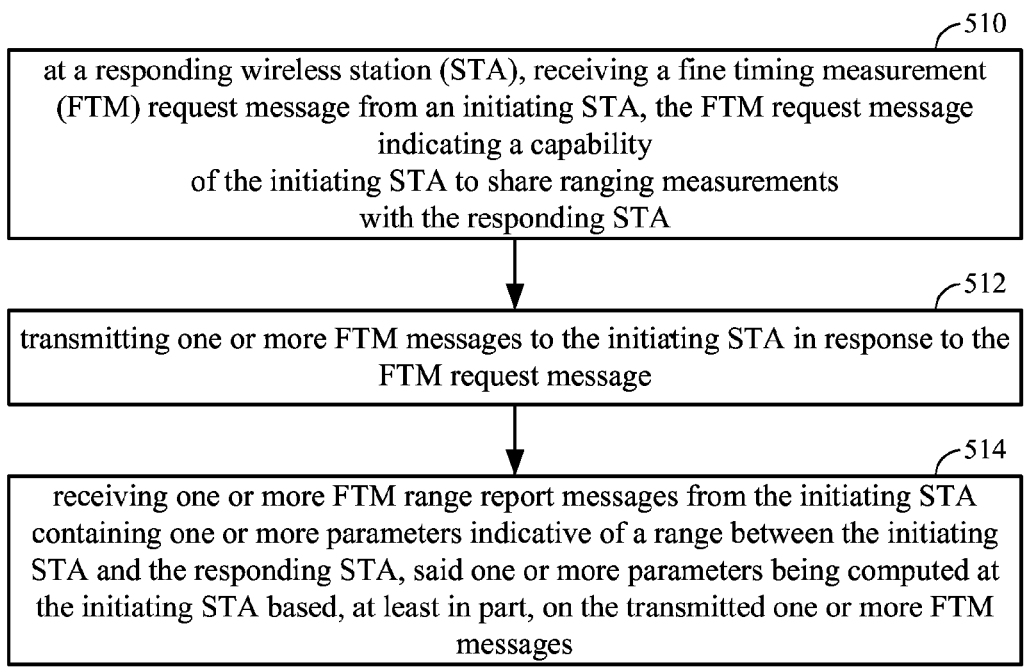

FIGS. 5 and 6 are flow diagrams of processes that may be carried out by STAs in connection with an exchange of messages to facilitate computation of an RTT or other parameter indicative of range. In another particular implementation, the process at FIG. 5 may be carried out by an initiating STA and the process at FIG. 6 may be carried out by a responding STA. At block 502, for example, an initiating STA may transmit an FTM request message to a responding STA indicating a capability of the initiating to share one or more ranging parameters with other STAs. As shown in FIGS. 3 and 4, such an indication of a capability to share one or more ranging parameters with other STAs may comprise a particular value in a Trigger field such as two. Ranging parameters to be shared may include, for example, a computed RTT, computed range (e.g., in units of distance computed based on RTT), maximum range error, timestamp values indicative of a range between an initiating STA and a responding STA, just to provide a few examples. It should be understood, however, that these are merely examples of parameters that may be indicative of a range between an initiating STA and a responding STA, and that claimed subject matter is not limited in this respect.

At block 510, a responding STA may receive an FTM request message transmitted by an initiating STA at block 502. In response to the FTM request message received at block 510, the responding STA may transmit one or more FTM messages to the initiating STA at block 512. At block 504, the initiating STA may receive the one or more FTM messages transmitted at block 512 and compute one or more parameters indicative of a range between the initiating STA and the responding STA. As pointed out above, such parameters indicative of a range may indicate a computed RTT value, computed range measurement in units, just to provide a few examples.

Parameters computed at block 506 may be transmitted from the initiating STA to the responding STA at block 508. For example, parameters computed at block 506 may be transmitted in an FTM range report message as shown in FIGS. 3 and 4.

According to an embodiment, a responding STA at block 512 may selectively transmit one or more FTM messages if in response to an FTM request message including an indication of a capability of an initiating STA to provide FTM range report messages. In the absence of such an indication in a received FTM request message, responding STA may refrain from transmitting FTM messages in response to the received FTM request message.

In one implementation, an FTM range request message preceding a FTM request message as shown in FIG. 4 may be transmitted to STAs which are capable of sharing computed range parameters. Such an FTM range request message may be transmitted according to the IEEE std. 802.11 at section 8.4.2.20.19. In a particular implementation, there may also be an "FTM range share" bit in the Extended Capabilities element. As shown, in response to receipt of an FTM range request message, the initiating STA may first transmit an ACK message corresponding to the FTM range request message, followed by transmission of an FTM request message. The FTM request message may further specify a value of two in a trigger field to indicate that the initiating STA is capable of and/or willing to transmit a FTM range report message containing a computed RTT measurement or other parameters indicative of range as discussed above.

In particular implementations, an ACK message as shown in FIGS. 2 through 4 may be generated by a hardwired device/logic in a wireless transceiver that is not programmable to form FTM range report messages. In an embodiment, logic to form and transmit FTM range report messages may be implemented in a programmable device (e.g., DSP or other programmable processor device). For example, logic to form and initiate transmission of FTM range report messages may be implemented machine-readable instructions of a software program hosted on an application processor.

FIG. 7 shows fields of an FTM range report message according to an embodiment. In this particular implementation, an initiating STA may obtain range measurements from STAs other than a recipient of the FTM range report message (e.g., computed from associated RTT measurements). Here, a range entry count field may specify a number ("M") of distinct STAs to which ranges are being provided in the FTM range report message. A range entry field may then include an eleven or thirteen byte value for each computed range that is being provided (e.g., for a total of M computed range values). Thus, range report messages may comprise measured ranges between the initiating STA and the responding STA, and also between the initiating STA and at least one other responding STA. It should be understood that this is merely an example of how computed one or more parameters indicative of a range may be expressed in a field of an FTM range report message, and that claimed subject matter is not limited in this respect.

FIG. 8 shows fields of a range entry portion of an FTM range report message according to an embodiment. A field "Measurement Start Time or Partial TSF Timer" may specify an initial time at which a transaction for obtaining the range measurement started. A field "BSSID" may include a BSSID value unique to the STA to which the RTT measurement was computed. In an alternative implementation, a BSSID field may be omitted if the FTM range report is based on a preceding exchange of FTM request messages and FTM messages between initiating and responding STAs. However, other unique identifiers may be used. A field "Range" may specify a value for the computed range (e.g., based on RTT). In one embodiment, field Range may express a range $1/256$, $1/64$ meters or $1/32$ meters, depending on a state of a byte in field "Max Range Error."

Figure 9:
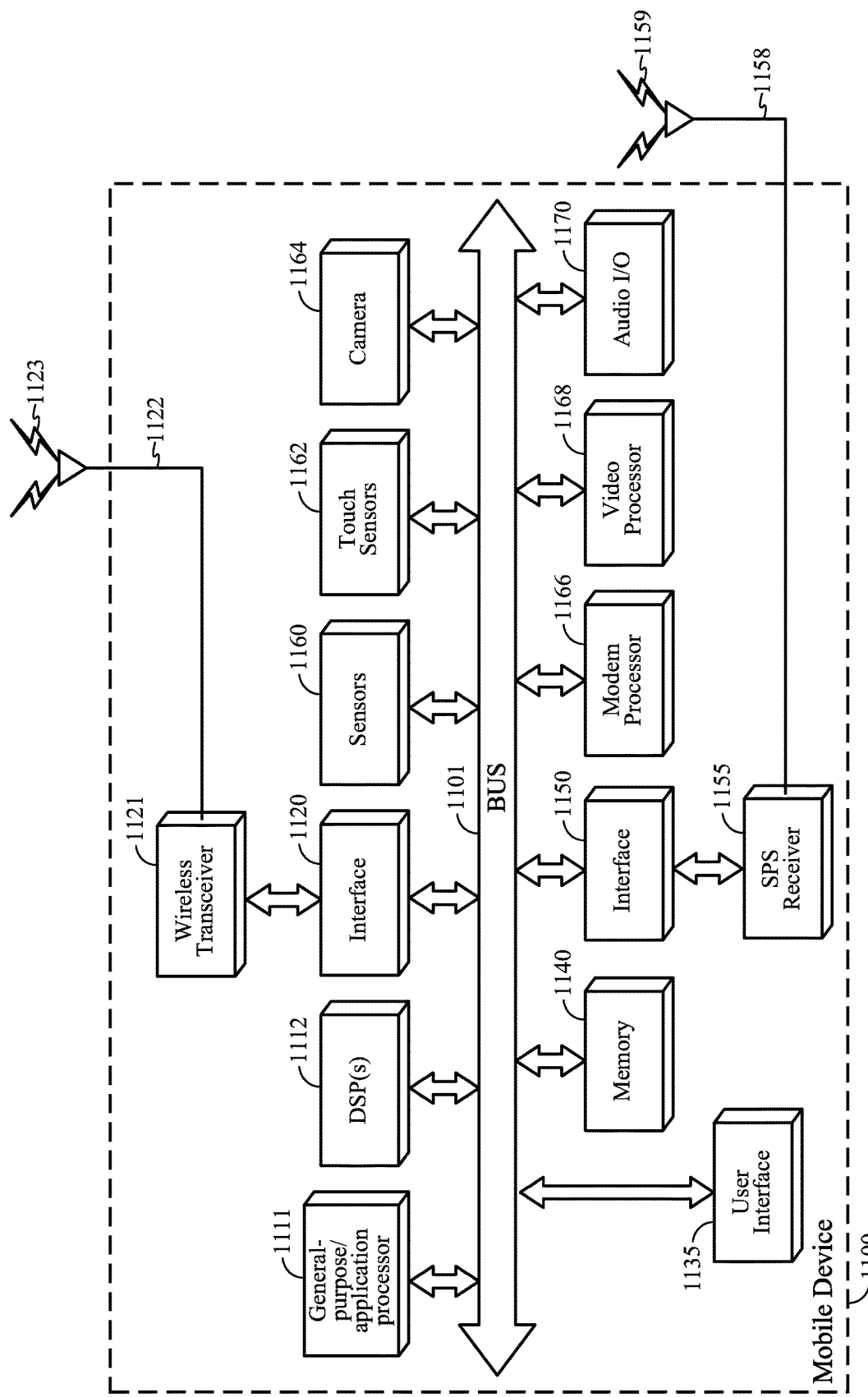
FIG. 9 is a schematic block diagram illustrating an exemplary device, in accordance with an implementation.

FIG. 9 is a schematic diagram of a mobile device according to an embodiment. Mobile device 100 (FIG. 1) may comprise one or more features of mobile device 1100 shown in FIG. 9. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 9, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 3 and 4, or actions depicted in FIGS. 5 and 6.

In one particular implementation, transmission of an ACK message in response to a FTM measurement request message may be performed by wireless transceiver device 1121 without instruction or initiation from general-purpose processor(s) 1111 or DSP(s) 1112. On the other hand, an FTM range report message may be formed at a programmable device such as general-purpose processor(s) 1111 and/or DSP(s) 1112 (e.g., from execution of one or more machine-readable instructions stored in memory 1140).

Also shown in FIG. 9, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 10:
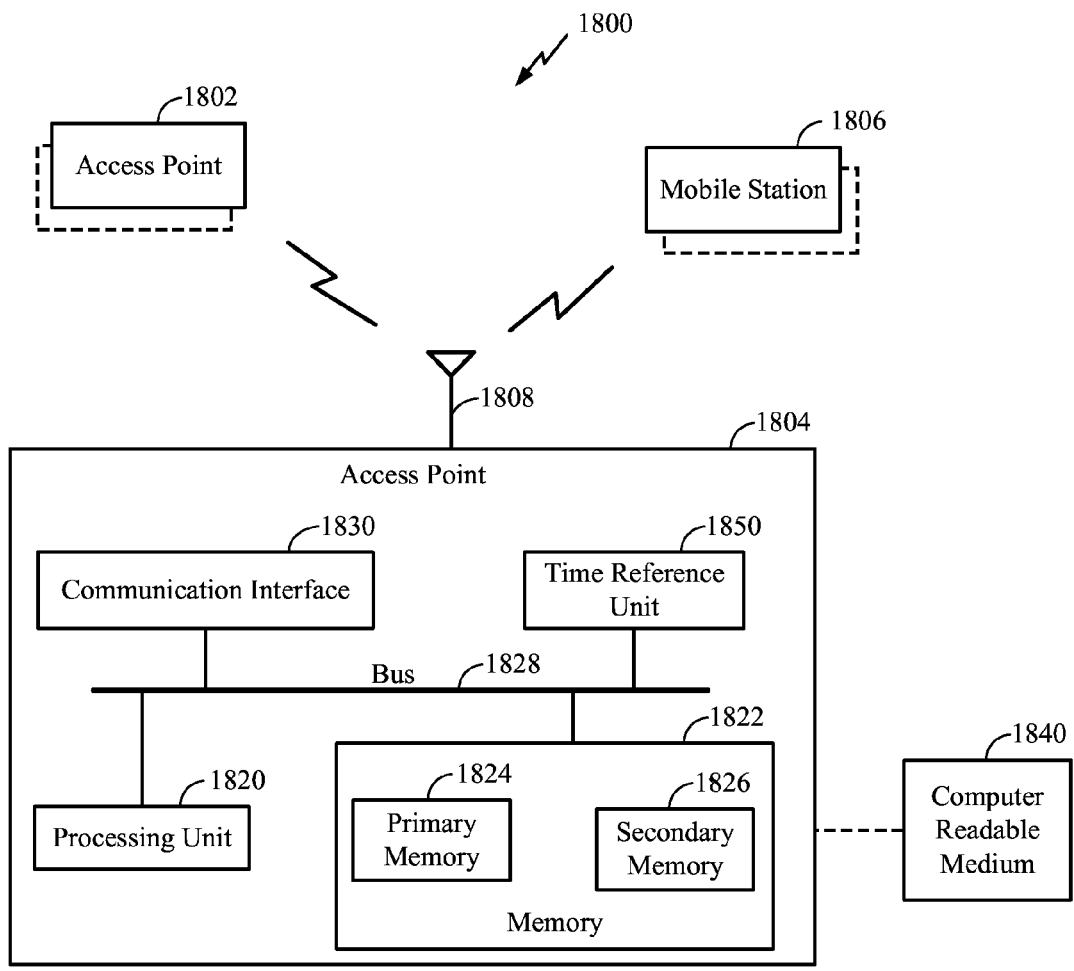
FIG. 10 is a schematic block diagram of an example computing system in accordance with an implementation.

FIG. 10 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115 or base station transceiver 110) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 9, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 9, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 9, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820. In a particular implementation, memory 1822 and processing unit 1820 may be configured to execute one or more aspects of process discussed above in connection with FIGS. 3 and 4.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver, and the like. In other alternative implementations, communication interface 1830 may comprise a wired/LAN interface, wireless LAN interface (e.g., IEEE std. 802.11 wireless interface) and/or a wide area network (WAN) air interface. In a particular implementation, antenna 1808 in combination with communication interface 1830 may be used to implement transmission and reception of signals as illustrated in FIGS. 3 and 4, or actions performed in connection with FIGS. 5 and 6.

In one particular implementation, transmission of an ACK message in response to a FTM measurement request message may be performed at communication interface 1830 without instruction or initiation from processing unit 1830. On the other hand, an FTM range report message may be formed at a programmable device such as processing unit 1820 (e.g., from execution of one or more machine-readable instructions stored in memory 1820).

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, trackball, touch screen, data port, etc.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, messages, frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. At an initiating wireless station (STA), a method for obtaining fine timing measurements comprising:
    transmitting a fine timing measurement (FTM) request message to a responding STA, the FTM request message indicating a capability of the initiating STA to share at least one ranging parameter with the responding STA, the at least one ranging parameter comprising one or more parameters indicative of one or more distances between at least one pair of devices;
    receiving one or more FTM messages from the responding STA in response to the FTM request message;
    determining one or more parameters indicative of a range between the initiating STA and the responding STA based, at least in part, on a time of transmission of at least one of the one or more FTM messages; and
    transmitting one or more FTM range report messages containing the one or more parameters to the responding STA.

2. The method of claim 1, and further comprising:
    transmitting an acknowledgement (ACK) message to the responding STA in response to receipt of an FTM message of the one or more FTM messages received from the responding STA.

3. The method of claim 1, wherein transmitting the FTM request message to the responding STA comprises transmitting the FTM request message in response to receipt of an FTM range request message transmitted from the responding STA.

4. The method of claim 1, and wherein the transmitted one or more FTM range report messages contain one or more parameters indicative of a distance between the initiating STA to one or more wireless transceiver devices other than the responding STA.

5. The method of claim 4, wherein at least one of the one or more FTM range report messages comprises a BSSID value unique to at least one of the one or more wireless transceiver devices other than the responding STA.

6. The method of claim 1, wherein at least one of the one or more FTM range report messages comprises a range entry field for each wireless transceiver device for which parameters indicative of a distance between the wireless transceiver device and the initiating STA is provided in the at least one of the one or more FTM range report messages.

7. The method of claim 6, wherein the range entry field comprises a set number of bytes and wherein at least one of the parameters indicative of the distance between the wireless transceiver device and the initiating STA is expressed as fractions of a meter.

8. The method of claim 7, wherein units of the parameters indicative of the range are determined based, at least in part, on a state of a byte in a "Max Range Error" field.

9. An initiating wireless station (STA), comprising:
    a transceiver to transmit messages to and receive messages from a wireless communication network; and
    one or more processors configured to:
    initiate transmission of a fine timing measurement (FTM) request message through the transceiver to a responding STA, the FTM request message indicating a capability of the initiating STA to share at least one ranging parameter with the responding STA, the at least one ranging parameter comprising one or more parameters indicative of one or more distances between at least one pair of devices;
    obtain one or more FTM messages received at the transceiver from the responding STA in response to the FTM request message;
    determine one or more parameters indicative of a range between the initiating STA and the responding STA based, at least in part, on a time of transmission of at least one of the one or more FTM messages; and
    initiate transmission of one or more FTM range report messages containing the one or more parameters through the transceiver to the responding STA.

10. The initiating STA of claim 9, wherein the FTM request message is transmitted to the responding STA in response to receipt of an FTM range request message transmitted from the responding STA.

11. The initiating STA of claim 9, wherein the transmitted one or more FTM range report messages contain one or more parameters indicative of a distance between the initiating STA and one or more wireless transceiver devices other than the responding STA.

12. The initiating STA of claim 11, wherein at least one of the one or more FTM range report messages comprises a BSSID value unique to at least one of the one or more wireless transceiver devices other than the responding STA.

13. The initiating STA of claim 9, wherein at least one of the one or more FTM range report messages comprises a range entry field for each wireless transceiver device for which parameters indicative of a distance between the wireless transceiver device and the initiating STA is provided in the at least one of the one or more FTM range report messages.

14. The initiating STA of claim 13, wherein the range entry field comprises a set number of bytes and wherein one or more parameters indicative of the distance between the wireless transceiver device and the initiating STA are expressed as fractions of a meter.

15. The initiating STA of claim 14, wherein units of the parameters indicative of the range are determined based, at least in part, on a state of a byte in a "Max Range Error" field.

16. At a responding wireless station (STA), a method for obtaining fine timing measurements comprising:
    receiving a fine timing measurement (FTM) request message from an initiating STA, the FTM request message indicating a capability of the initiating STA to share at least one ranging parameter with the responding STA, the at least one ranging parameter comprising one or more parameters indicative of one or more distances between at least one pair of devices;
    transmitting one or more FTM messages to the initiating STA in response to the FTM request message; and
    receiving one or more FTM range report messages from the initiating STA containing one or more parameters indicative of a range, the one or more parameters being determined at the initiating STA based, at least in part, on a time of transmission of at least one of the transmitted one or more FTM messages.

17. The method of claim 16, and further comprising transmitting an FTM range request message to the initiating STA prior to transmission of the FTM request message.

18. The method of claim 16, and wherein the one or more FTM range report messages contain one or more additional parameters indicative of a distance between the initiating STA and one or more wireless transceiver devices other than the responding STA.

19. The method of claim 18, wherein at least one of the one or more FTM range report messages comprises a BSSID value unique to at least one of the one or more wireless transceiver devices other than the initiating STA.

20. The method of claim 16, wherein at least one of the one or more FTM range report messages comprises a range entry field for each wireless transceiver device for which parameters indicative of a distance between the wireless transceiver device and the initiating STA is provided in the at least one of the one or more FTM range report messages.

21. The method of claim 20, wherein the range entry field comprises a set number of bytes and wherein at least one of the one or more of the parameters indicative of the distance between the wireless transceiver device and the initiating STA is expressed as fractions of a meter.

22. The method of claim 21, wherein units of the parameters indicative of the range are determined based, at least in part, on a state of a byte in a "Max Range Error" field.

23. The method of claim 16, wherein the one or more FTM messages are transmitted further in response to a presence of an indication of the capability of the initiating STA to share the at least one ranging parameter with the responding STA in the FTM request message.

24. A responding wireless station (STA), comprising:
a transceiver to transmit messages to and receive messages from a wireless communication network; and
one or more processors configured to:
obtain a fine timing measurement (FTM) request message received at the transceiver from an initiating STA, the FTM request message indicating a capability of the initiating STA to share the at least one ranging parameter with the responding STA, the at least one ranging parameter comprising one or more parameters indicative of one or more distances between at least one pair of devices;
initiate transmission of one or more FTM messages through the transceiver to the initiating STA in response to the FTM request message; and
obtain one or more FTM range report messages received at the transceiver from the initiating STA containing one or more parameters indicative of a range, the one or more parameters being determined at the initiating STA based, at least in part, on a time of transmission of at least one of the transmitted one or more FTM messages.

25. The responding STA of claim 24, wherein at least one of the one or more FTM range report messages comprises measured ranges including at least a first range between the initiating STA and the responding STA, and a second range between the initiating STA and at least one other wireless transceiver device.

26. The responding STA of claim 24, and wherein the one or more FTM range report messages contain one or more additional parameters indicative of a distance between the initiating STA and one or more wireless transceiver devices other than the responding STA.

27. The responding STA of claim 26, wherein at least one of the one or more FTM range report messages comprises a BSSID value unique to at least one of the one or more wireless transceiver devices other than the initiating STA.

28. The responding STA of claim 24, wherein the one or more processors are further configured to initiate transmission of an FTM range request message through the transceiver to the initiating STA prior to transmission of the FTM request message.

29. The responding STA of claim 24, wherein the FTM request message comprises a value in a Trigger field indicating that the FTM request message comprises the one or more parameters indicative of the range embedded in a particular field of the FTM request message.

30. The method of claim 1, wherein the FTM request message comprises a trigger field, the trigger field indicating a capability of the initiating STA to share the at least one ranging parameter with the responding STA.

31. The method of claim 1, the FTM request message further indicating a capability of the initiating STA to communicate a range report message, comprising the at least one ranging parameter, to the responding STA.

* * * * *

UNITED STATES PATENT AND TRADEMARK OFFICE
CERTIFICATE OF CORRECTION

PATENT NO. : 9,560,620 B2
APPLICATION NO. : 14/699966
DATED : January 31, 2017
INVENTOR(S) : Aldana et al.

Page 1 of 1

It is certified that error appears in the above-identified patent and that said Letters Patent is hereby corrected as shown below:

On the Title Page

Item (72) Inventor is corrected to read:
-- Carlos Horacio Aldana, Mountain View (CA);
Subash Marri Sridhar, San Jose (CA) --.

Signed and Sealed this
Twenty-first Day of August, 2018

Andrei Iancu
*Director of the United States Patent and Trademark Office*